(12) United States Patent  
Esaka et al.

(10) Patent No.: US 7,913,307 B2  
(45) Date of Patent: Mar. 22, 2011

(54) SEMICONDUCTOR INTEGRATED CIRCUIT AND INFORMATION PROCESSING APPARATUS

(75) Inventors: Seiji Esaka, Tokyo (JP); Shigeru Arisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1129 days.

(21) Appl. No.: 11/175,372

(22) Filed: Jul. 7, 2005

(65) Prior Publication Data

US 2006/0010328 A1 Jan. 12, 2006

(30) Foreign Application Priority Data

Jul. 7, 2004 (JP) ................................ 2004-201075

(51) Int. Cl.
*G06F 7/04* (2006.01)
*G06F 17/30* (2006.01)
*H04N 7/16* (2006.01)

(52) U.S. Cl. ............ 726/26; 713/193; 713/190; 711/164

(58) Field of Classification Search .................. 713/190, 713/193; 726/26, 27; 711/164
See application file for complete search history.

(56) References Cited

U.S. PATENT DOCUMENTS

| | | | | |
|---|---|---|---|---|
| 4,791,669 A * | 12/1988 | Kage | ........................... | 380/46 |
| 4,960,982 A * | 10/1990 | Takahira | ........................ | 235/382 |
| 5,428,685 A * | 6/1995 | Kadooka et al. | ............... | 713/190 |
| 5,892,826 A * | 4/1999 | Brown et al. | .................. | 713/190 |
| 5,943,283 A * | 8/1999 | Wong et al. | ............... | 365/230.01 |
| 6,161,184 A * | 12/2000 | Niimura | ........................... | 726/33 |
| 6,240,183 B1 * | 5/2001 | Marchant | ......................... | 380/28 |
| 6,278,783 B1 * | 8/2001 | Kocher et al. | .................. | 380/277 |
| 6,510,518 B1 * | 1/2003 | Jaffe et al. | ...................... | 713/168 |
| 6,606,707 B1 * | 8/2003 | Hirota et al. | .................... | 713/172 |
| 6,611,907 B1 * | 8/2003 | Maeda et al. | .................. | 711/170 |
| 6,618,789 B1 * | 9/2003 | Okaue et al. | ................... | 711/103 |
| 6,647,496 B1 * | 11/2003 | Tagawa et al. | ................. | 713/193 |
| 6,668,326 B1 * | 12/2003 | Sella et al. | .......................... | 726/6 |
| 6,789,192 B2 * | 9/2004 | Hirota et al. | .................... | 713/172 |
| 6,820,203 B1 * | 11/2004 | Okaue et al. | .................. | 713/193 |
| 6,829,676 B2 * | 12/2004 | Maeda et al. | .................. | 711/103 |
| 6,871,278 B1 * | 3/2005 | Sciupac | ......................... | 713/185 |
| 6,938,165 B2 * | 8/2005 | Inoue et al. | .................... | 713/193 |
| 6,968,397 B1 * | 11/2005 | Kanamoto | ..................... | 709/250 |
| 6,970,070 B2 * | 11/2005 | Juels et al. | ..................... | 340/10.1 |
| 6,971,022 B1 * | 11/2005 | Katta et al. | .................... | 713/193 |
| 6,990,026 B2 * | 1/2006 | Yagi | ............................... | 365/195 |
| 6,996,725 B2 * | 2/2006 | Ma et al. | .......................... | 726/22 |

(Continued)

FOREIGN PATENT DOCUMENTS

JP        04-036834 A        2/1992

(Continued)

OTHER PUBLICATIONS

Singapore Search Report mailed Mar. 27, 2006.

(Continued)

*Primary Examiner* — David García Cervetti  
(74) *Attorney, Agent, or Firm* — Rader, Fishman & Grauer PLLC

(57) ABSTRACT

A semiconductor integrated circuit includes an encryption unit for generating encrypted data by encrypting data to be stored in an external memory disposed outside the semiconductor integrated circuit, a write unit for writing the encrypted data into the external memory, a reading unit for reading out the encrypted data from the external memory, and a decryption unit for decrypting the readout encrypted data.

8 Claims, 4 Drawing Sheets

U.S. PATENT DOCUMENTS

| | | | |
|---|---|---|---|
| 6,999,948 B1* | 2/2006 | Hatanaka et al. | 705/65 |
| 7,046,810 B2* | 5/2006 | Takada et al. | 380/284 |
| 7,121,471 B2* | 10/2006 | Beenau et al. | 235/487 |
| 7,135,976 B2* | 11/2006 | Neff et al. | 340/572.1 |
| 7,136,488 B2* | 11/2006 | Hashimoto et al. | 380/277 |
| 7,171,566 B2* | 1/2007 | Durrant | 713/189 |
| 7,200,567 B2* | 4/2007 | Caci et al. | 705/26 |
| 7,225,334 B2* | 5/2007 | Bianchi | 713/164 |
| 7,225,335 B2* | 5/2007 | Sato | 713/164 |
| 7,269,732 B2* | 9/2007 | Kilian-Kehr | 713/172 |
| 7,306,158 B2* | 12/2007 | Berardi et al. | 235/492 |
| 7,340,614 B2* | 3/2008 | Fujiwara et al. | 713/193 |
| 7,350,230 B2* | 3/2008 | Forrest | 726/9 |
| 7,353,543 B2* | 4/2008 | Ohmori et al. | 726/29 |
| 7,424,622 B2* | 9/2008 | Hashimoto et al. | 713/194 |
| 7,424,732 B2* | 9/2008 | Matsumoto et al. | 726/2 |
| 7,429,927 B2* | 9/2008 | Bonalle et al. | 340/572.8 |
| 7,472,285 B2* | 12/2008 | Graunke et al. | 713/193 |
| 7,546,469 B2* | 6/2009 | Suzuki et al. | 713/176 |
| 7,675,979 B1* | 3/2010 | Yu et al. | 375/259 |
| 2001/0018736 A1* | 8/2001 | Hashimoto et al. | 713/1 |
| 2001/0039620 A1* | 11/2001 | Berry et al. | 713/193 |
| 2002/0005774 A1* | 1/2002 | Rudolph et al. | 340/5.61 |
| 2002/0034302 A1* | 3/2002 | Moriai et al. | 380/270 |
| 2002/0073326 A1* | 6/2002 | Fontijn | 713/190 |
| 2002/0095382 A1* | 7/2002 | Taoka et al. | 705/50 |
| 2002/0101995 A1* | 8/2002 | Hashimoto et al. | 380/277 |
| 2002/0174337 A1* | 11/2002 | Aihara | 713/172 |
| 2002/0176573 A1* | 11/2002 | Futa et al. | 380/44 |
| 2003/0033537 A1* | 2/2003 | Fujimoto et al. | 713/193 |
| 2003/0046563 A1* | 3/2003 | Ma et al. | 713/190 |
| 2003/0061499 A1* | 3/2003 | Durrant | 713/189 |
| 2003/0084308 A1* | 5/2003 | Van Rijnswou | 713/189 |
| 2003/0097340 A1* | 5/2003 | Okamoto et al. | 705/65 |
| 2003/0196027 A1* | 10/2003 | Maeda et al. | 711/103 |
| 2003/0196028 A1* | 10/2003 | Maeda et al. | 711/103 |
| 2003/0196064 A1* | 10/2003 | Maeda et al. | 711/173 |
| 2003/0200411 A1 | 10/2003 | Maeda et al. | 711/173 |
| 2003/0200448 A1* | 10/2003 | Foster et al. | 713/189 |
| 2003/0221103 A1* | 11/2003 | Hirota et al. | 713/172 |
| 2004/0008554 A1* | 1/2004 | Kanamori et al. | 365/202 |
| 2004/0019793 A1* | 1/2004 | Sato | 713/181 |
| 2004/0059685 A1* | 3/2004 | Sakamura et al. | 705/65 |
| 2004/0059916 A1* | 3/2004 | Mizushima et al. | 713/172 |
| 2004/0059928 A1* | 3/2004 | Fujiwara et al. | 713/189 |
| 2004/0124966 A1* | 7/2004 | Forrest | 340/5.8 |
| 2004/0139338 A1* | 7/2004 | Ohmori et al. | 713/193 |
| 2004/0210707 A1* | 10/2004 | Ohara et al. | 711/103 |
| 2004/0218214 A1* | 11/2004 | Kihara et al. | 358/1.16 |
| 2004/0233037 A1* | 11/2004 | Beenau et al. | 340/5.83 |
| 2004/0233054 A1* | 11/2004 | Neff et al. | 340/539.1 |
| 2004/0236699 A1* | 11/2004 | Beenau et al. | 705/64 |
| 2004/0246096 A1* | 12/2004 | Queenan | 340/5.61 |
| 2004/0246097 A1* | 12/2004 | Queenan | 340/5.61 |
| 2004/0250074 A1* | 12/2004 | Kilian-Kehr | 713/172 |
| 2004/0268074 A1* | 12/2004 | Yagi | 711/164 |
| 2004/0268132 A1* | 12/2004 | Waris | 713/185 |
| 2005/0018854 A1* | 1/2005 | Yamamoto et al. | 380/277 |
| 2005/0021986 A1* | 1/2005 | Graunke et al. | 713/193 |
| 2005/0092823 A1* | 5/2005 | Lupoli et al. | 235/375 |
| 2005/0116024 A1* | 6/2005 | Beenau et al. | 235/380 |
| 2005/0160277 A1* | 7/2005 | Sciupac | 713/185 |
| 2005/0269407 A1* | 12/2005 | Harmon | 235/435 |
| 2006/0059369 A1* | 3/2006 | Fayad et al. | 713/189 |
| 2006/0069925 A1* | 3/2006 | Nakai et al. | 713/193 |
| 2006/0221760 A1* | 10/2006 | Chen | 365/233 |
| 2006/0280299 A1* | 12/2006 | Przybilla | 380/44 |
| 2007/0045417 A1* | 3/2007 | Tsai et al. | 235/441 |
| 2007/0112685 A1* | 5/2007 | Yamamichi | 705/64 |
| 2007/0154018 A1* | 7/2007 | Watanabe | 380/273 |
| 2008/0109371 A1* | 5/2008 | Sakamura et al. | 705/67 |
| 2008/0209115 A1* | 8/2008 | Maeda et al. | 711/103 |
| 2008/0224857 A1* | 9/2008 | Lupoli et al. | 340/539.23 |

FOREIGN PATENT DOCUMENTS

| | | |
|---|---|---|
| JP | 05-053921 A | 3/1993 |
| JP | 07-219852 A | 8/1995 |
| JP | 10-224343 A | 8/1998 |
| JP | 10-303879 A | 11/1998 |
| JP | 11-025003 | 1/1999 |
| JP | 2000-029790 A | 1/2000 |
| JP | 2001-338271 A | 12/2001 |
| JP | 2002-328844 A | 11/2002 |
| JP | 2003-022421 A | 1/2003 |
| JP | 2003-141477 A | 5/2003 |
| JP | 2003-203013 A | 7/2003 |
| JP | 2004-145449 A | 5/2004 |

OTHER PUBLICATIONS

Singapore Written Opinion mailed Mar. 27, 2006.

EPO Search Report mailed Oct. 7, 2005.

B. Schneier, "Applied Cryptography, Encrypting Data for Storage", Applied Cryptography, Protocols, Algorithms, and Source Code Inc., New York, 1996, pp. 220-277.

Japanese Office Action issued Jul. 8, 2010 for corresponding Japanese Application No. 2004-201075.

* cited by examiner

SEMICONDUCTOR INTEGRATED CIRCUIT AND INFORMATION PROCESSING APPARATUS

CROSS REFERENCES TO RELATED APPLICATIONS

The present invention contains subject matter related to Japanese Patent Application JP 2004-201075 filed in the Japanese Patent Office on Jul. 7, 2004, the entire contents of which are incorporated herein by reference.

BACKGROUND OF THE INVENTION

1. Field of the Invention

The present invention relates to a semiconductor integrated circuit and an information processing apparatus and more specifically relates to a reader-writer apparatus capable of performing data communication with a noncontact integrated circuit (IC) card without any contact and a semiconductor integrated circuit included in the reader-writer apparatus.

2. Description of the Related Art

Noncontact IC card systems using noncontact IC cards have been commonly used recently in automatic ticket gates at train stations, security systems and electronic money systems.

In such a noncontact IC card system, for example, if a user holds a noncontact IC card against a reader-writer apparatus, data communication begins between the noncontact IC card and the reader-writer apparatus.

More specifically, in such a case, the reader-writer apparatus emits electromagnetic waves to the noncontact IC card via an antenna unit. The noncontact IC card rectifies the voltage induced in the antenna unit in the noncontact IC card in response to the electromagnetic waves and uses this as a driving power to operate without a battery.

Such a reader-writer apparatus includes an antenna unit configured to perform data communication with a noncontact IC card and a semiconductor integrated circuit connected with the antenna unit. The semiconductor integrated circuit executes programs of various processing for performing data communication with a noncontact IC card accordingly. The programs are stored in an internal memory included in the semiconductor integrated circuit. The internal memory in the semiconductor integrated circuit also stores other various programs and data items (refer to Japanese Patent Unexamined Patent Application Publication No. 11-25003 illustrated in FIG. 2).

SUMMARY OF THE INVENTION

Recently, the amount of data handled by semiconductor integrated circuits has been increasing. Therefore, structures for storing data not only in an internal memory in a semiconductor integrated circuit but also in an external memory disposed outside the semiconductor integrated circuit have been proposed.

However, if data processed by the semiconductor integrated circuit are stored directly in an external memory, the data can be easily exposed compared to data stored inside the semiconductor integrated circuit. Therefore, data could not be stored very securely in an external memory.

A semiconductor integrated circuit and an information processing apparatus according to an embodiment of the present invention are capable of storing data securely in an external memory.

According to embodiments of the present invention, a semiconductor integrated circuit includes encrypting means for generating encrypted data by encrypting the data to be stored in an external memory disposed outside the semiconductor integrated circuit, write means for writing in the encrypted data in the external memory, reading means for reading out the encrypted data from the external memory, and decrypting means for decrypting the readout encrypted data.

An information processing apparatus according to an embodiment of the present invention includes a semiconductor integrated circuit and an external memory disposed outside the semiconductor integrated circuit. The semiconductor integrated circuit includes encrypting means for generating encrypted data by encrypting the data to be stored in an external memory disposed outside the semiconductor integrated circuit, write means for writing in the encrypted data in the external memory, readout means for reading out the encrypted data from the external memory, and decrypting means for decrypting the readout encrypted data.

Accordingly, by encrypting the data to be stored in the external memory, the data can be safely stored in the external memory.

In the semiconductor integrated circuit according to an embodiment of the present invention, the encrypting means generates the encrypted data by performing encryption in accordance with the storage location of the data to be stored in the external memory, and the decrypting means decrypts the readout encrypted data in accordance with the storage location of the encrypted data.

In the information processing apparatus according to an embodiment of the present invention, the encrypting means generates the encrypted data by performing encryption in accordance with the storage location of the data to be stored in the external memory, and the decrypting means decrypts the readout encrypted data in accordance with the storage location of the encrypted data.

According to an embodiment of the present invention, data can be stored securely in an external memory by encrypting the data to be stored in the external memory.

The data to be stored in the external memory are encrypted in accordance with the storage location of the data. Consequently, for example, if the encrypted data are copied from the external memory onto another storage medium, it will be difficult to decrypt the encrypted data without knowing the storage location of the encrypted data in the external memory. As a result, data can be securely stored in the external memory.

DESCRIPTION OF THE PREFERRED EMBODIMENTS

Embodiments of the present invention will now be described in detail with reference to the drawings.

(1) Structure of Reader-Writer Apparatus

Figure 1:
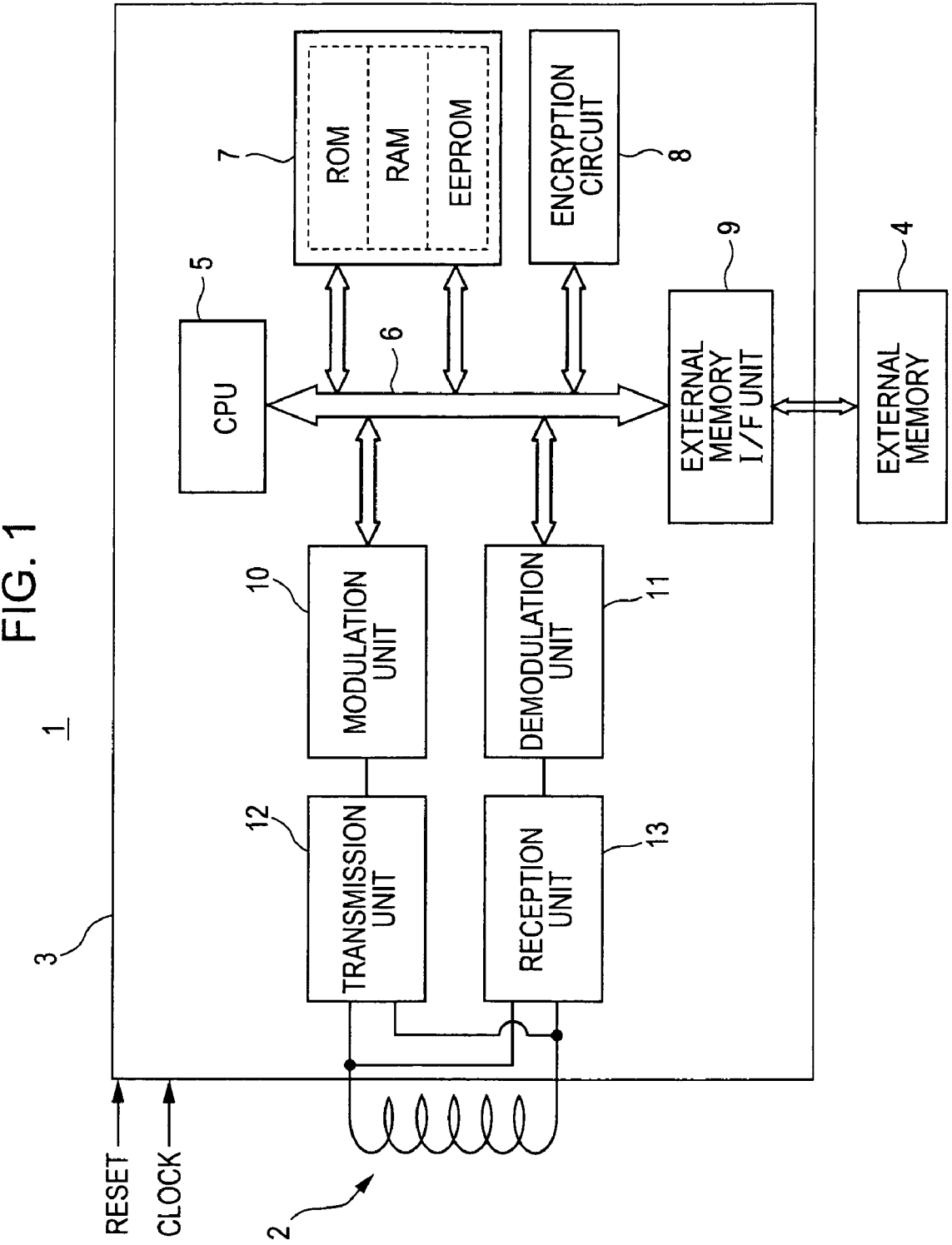
FIG. 1 illustrates a schematic view of the structure of a reader-writer apparatus according to an embodiment of the present invention.

FIG. 1 illustrates the overall view of a reader-writer apparatus 1 including an antenna unit 2 for performing data communication with an external noncontact IC card without contacting the noncontact IC card, a semiconductor integrated circuit 3 connected with the antenna unit 2, and an external memory 4 disposed outside the semiconductor integrated circuit 3. The external memory 4, for example, may be a nonvolatile memory, such as a flash memory.

In the semiconductor integrated circuit 3, a central processing unit (CPU) 5 controlling the entire semiconductor integrated circuit 3 is connected to an internal memory 7, which includes a read only memory (ROM), a random access memory (RAM), and an electrically erasable programmable read only memory (EEPROM), an encryption circuit 8 configured to carry out various encryption processes, as described below, an external memory interface unit 9 configured to control reading and writing of data in the external memory 4, a modulation unit 10, and a demodulation unit 11 via a bus 6.

The modulation unit 10 and the demodulation unit 11 are connected to the antenna unit 2 via a transmission unit 12 and a reception unit 13, respectively. For example, the modulation unit 10 modulates data to be sent to an external noncontact IC card under the control of the CPU 5 and supplies the signal obtained as a result to the transmission unit 12. At this time, the transmission unit 12 sends out the signal supplied from the modulation unit 10 to the outside via the antenna unit 2. The reception unit 13, for example, digitizes the signal received from the external noncontact IC card via the antenna unit 2 and supplies the digitized signal to the demodulation unit 11. At this time, the demodulation unit 11 demodulates the signal supplied from the reception unit 13 and sends the data obtained as a result to the CPU 5.

The semiconductor integrated circuit 3 according to an embodiment of the present invention has four modes for reading out data from and writing data in the external memory 4 disposed outside the semiconductor integrated circuit 3. The processes of writing in data and reading out data from the external memory 4 are performed by the CPU 5 of the semiconductor integrated circuit 3 in one of the four modes set in advance by the user. The four modes will be described below.

In a first mode, the CPU 5 of the semiconductor integrated circuit 3 supplies data to be stored in the external memory 4 to the external memory interface unit 9 and, at the same time, supplies address information indicating a storage location of the data in the external memory interface unit 9. At this time, the external memory interface unit 9 writes the supplied data in a storage location corresponding to the supplied address information in the storage area of the external memory 4.

When reading out such stored data from the external memory 4, the CPU 5 supplies address information indicating the storage location of the data to the external memory interface unit 9. At this time, the external memory interface unit 9 reads out the data stored at a storage location corresponding to the supplied address information in the storage area in the external memory 4 and supplies the readout data to the CPU 5.

In a second mode, the CPU 5 of the semiconductor integrated circuit 3 supplies data to be stored in the external memory 4 and address information indicating the storage location of the data to the encryption circuit 8 before supplying these to the external memory interface unit 9.

At this time, the encryption circuit 8 calculates the exclusive-OR for the supplied data and the supplied address information and supplies the data obtained as a result as encrypted data to the CPU 5. The CPU 5 then supplies the encrypted data sent from the encryption circuit 8 and the address information corresponding to the encrypted data to the external memory interface unit 9.

At this time, the external memory interface unit 9 writes in the encrypted data in a storage area in the external memory 4 corresponding to the storage location indicated by the supplied address information.

In this way, the address information indicating the storage location in the external memory 4 and the data encrypted by calculating the exclusive-OR are stored in the external memory 4.

To read out such encrypted data from the external memory 4, the CPU 5 supplies the address information indicating the storage location of the stored encrypted data to the external memory interface unit 9. At this time, the external memory interface unit 9 reads out the encrypted data stored at a storage location corresponding to the supplied address information in the storage area in the external memory 4. Subsequently, the external memory interface unit 9 calculates the exclusive-OR for the address information supplied from the CPU 5 and the readout encrypted data so as to decrypt the data and supplies the decrypted data to the CPU 5.

In a third mode, the CPU 5 of the semiconductor integrated circuit 3 supplies data to be stored in the external memory 4 and address information indicating the storage location of the data to the encryption circuit 8 before supplying these to the external memory interface unit 9.

At this time, the encryption circuit 8 calculates the exclusive-OR for the supplied data and the higher-order bits of the supplied address information and then performs data encryption standard (DES) encryption on the data obtained as a result of the calculation. The encryption circuit 8 according to this embodiment, for example, uses the higher 21 bits of the 24-bit address information as higher-order bits used for calculating the exclusive-OR.

Subsequently, the encryption circuit 8 supplies the data obtained from performing DES encryption to the CPU 5 as encrypted data. In response, the CPU 5 supplies the encrypted data supplied from the encryption circuit 8 and the corresponding address information to the external memory interface unit 9.

At this time, the external memory interface unit 9 writes in the encrypted data in a storage area in the external memory 4 corresponding to the storage location indicated by the supplied address information.

In this way, the address information indicating the storage location in the external memory 4 and the DES encrypted data encrypted by calculating the exclusive-OR are stored in the external memory 4.

When reading out encrypted data from the external memory 4, the CPU 5 supplies address information indicating the storage location of the encrypted data to the external memory interface unit 9. At this time, the external memory interface unit 9 reads out the encrypted data from a storage area in the external memory 4 corresponding to the storage location indicated by the supplied address information. Subsequently, the external memory interface unit 9 performs DES decryption on the readout encrypted data and decrypts the data by calculating the exclusive-OR for the resulting data and the higher-order bits of the address information. Then, the decrypted data are supplied to the CPU 5.

In a fourth mode, the CPU 5 of the semiconductor integrated circuit 3 supplies data to be stored in the external memory 4 and address information indicating the storage location of the data to the encryption circuit 8 before supplying these to the external memory interface unit 9.

At this time, the encryption circuit 8 calculates the exclusive-OR for the supplied data and the higher-order bits of the supplied address information and then performs triple DES encryption on the resulting data. In this case also, the encryption circuit 8, for example, uses the higher 21 bits of the 24-bit address information as higher-order bits used for calculating the exclusive-OR.

Subsequently, the encryption circuit 8 supplies the data obtained from performing triple DES encryption to the CPU 5 as encrypted data. In response, the CPU 5 supplies the encrypted data supplied from the encryption circuit 8 and the corresponding address information to the external memory interface unit 9.

At this time, the external memory interface unit 9 writes in the encrypted data in a storage area in the external memory 4 corresponding to the storage location indicated by the supplied address information.

In this way, the address information indicating the storage location in the external memory 4 and the triple DES encrypted data encrypted by calculating the exclusive-OR are stored in the external memory 4.

When reading out encrypted data from the external memory 4, the CPU 5 supplies address information indicating the storage location of the encrypted data to the external memory interface unit 9. At this time, the external memory interface unit 9 reads out the encrypted data from a storage area in the external memory 4 corresponding to the storage location indicated by the supplied address information. Subsequently, the external memory interface unit 9 performs triple DES decryption on the readout encrypted data and decrypts the data by calculating the exclusive-OR for the resulting data and the higher-order bits of the address information. Then, the decrypted data are supplied to the CPU 5.

When set to one of the second to fourth modes, the semiconductor integrated circuit 3 stores the encrypted data encrypted by the encryption circuit 8 in the external memory 4. When such encrypted data stored in the external memory 4 are read out from the external memory 4, the external memory interface unit 9 performs decryption of the encrypted data.

According to this embodiment, encrypted data are stored in the external memory 4 after the data are encrypted by the encryption circuit 8. However, the present invention is not limited, and, for example, the data may be encrypted outside the semiconductor integrated circuit 3 and then the encrypted data may be stored in the external memory 4 in advance.

(2) External Memory Interface Unit

Figure 2:
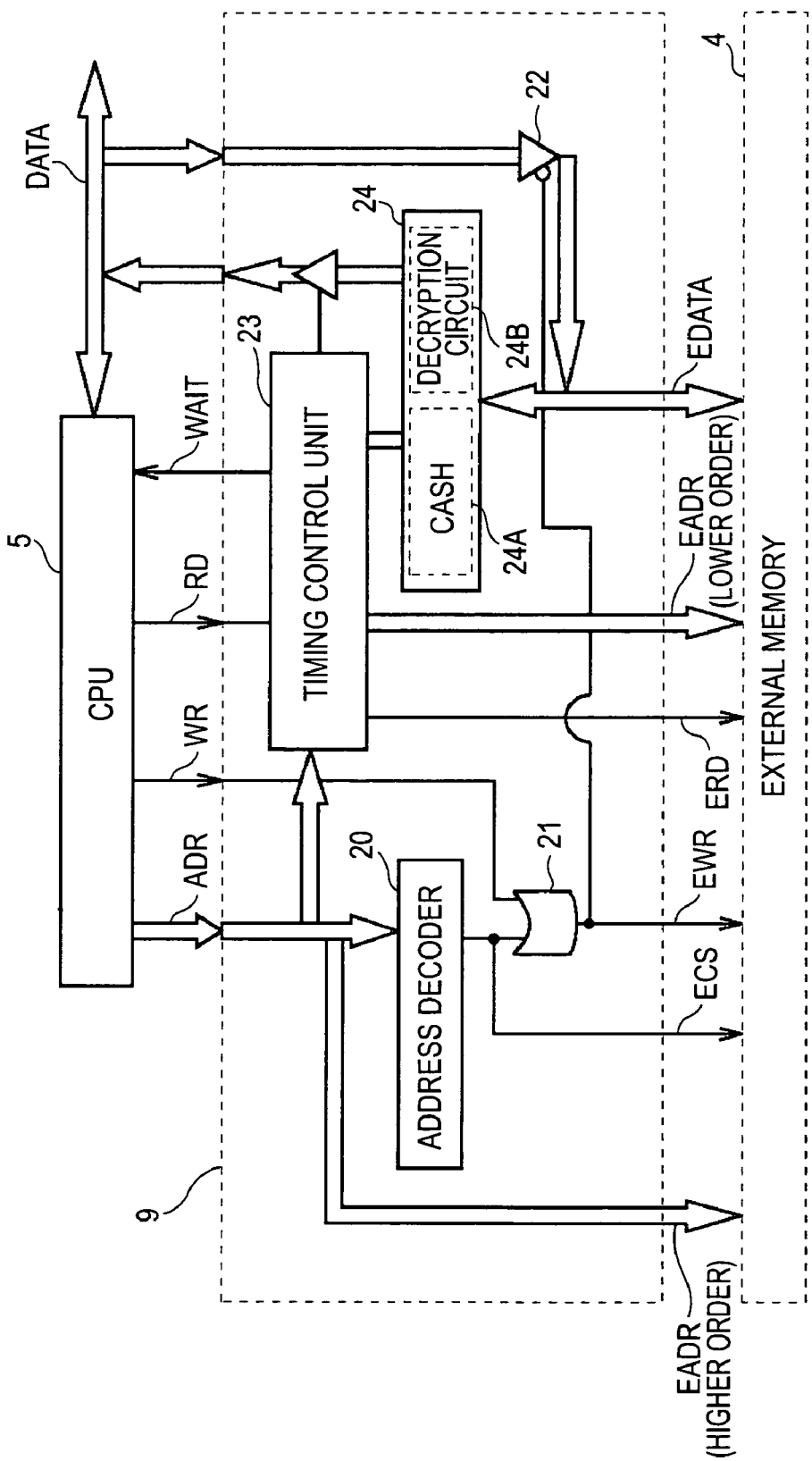
FIG. 2 illustrates a schematic view of the structure of an external interface unit (1)

The external memory interface unit 9 will now be described in detail with reference to FIG. 2. For example, in the first mode, the CPU 5 may supply data (DATA) to be stored in the external memory 4 and address information (ADR) indicating the storage location for the data (DATA) to the external memory interface unit 9 together with a data-write command signal (WR) of a write instruction for the data.

At this time, the address information (ADR) supplied from the CPU 5 is input to an address decoder 20 included in the external memory interface unit 9. The address decoder 20 generates a chip select signal (ECS) for assigning a memory chip among a plurality of memory chips included in the external memory 4 for writing in the data based on the input address information (ADR). Then the address decoder 20 outputs this chip select signal (ECS) to the external memory 4 and an OR circuit 21. In response, the OR circuit 21 sends the data-write command signal (WR) from the CPU 5 to the external memory 4 as a data-write command signal (EWR). When the data-write command signal (EWR) is output from the OR circuit 21 in this way, a switch circuit 22 sends the data (DATA) supplied from the CPU 5 via a data bus to the external memory 4 as output data (EDATA).

In the external memory interface unit 9, the address information (ADR) supplied from the CPU 5 is separated into higher-order bits and lower-order bits. Then, the higher-order bits are directly output to the external memory 4, and the lower-order bits are output to the external memory 4 via a timing control unit 23.

As a result, in response to the data-write command signal (EWR) from the external memory interface unit 9, the external memory 4 writes in the data (EDATA) from the external memory interface unit 9 in a storage location determined by the chip select signal (ECS) and address information (EADR) from the external memory interface unit 9.

For example, in the first mode, the CPU 5 may supply address information (ADR) indicating the storage location of data to be read out from the external memory 4 to the external memory interface unit 9 together with a data-readout command signal (RD) of a readout instruction for the data.

At this time, the address information (ADR) supplied from the CPU 5 is input to the address decoder 20 in the external memory interface unit 9. The address decoder 20 generates a chip select signal (ECS) based on the input address information (ADR) and outputs the generated chip select signal (ECS) to the external memory 4. In the external memory interface unit 9, the address information (ADR) is separated into higher-order bits and lower-order bits. Then the higher-order bits are directly output to the external memory 4 and the lower-order bits are output to the external memory 4 via the timing control unit 23.

In the external memory interface unit 9, the data-readout command signal (RD) supplied from the CPU 5 is input to the timing control unit 23. The timing control unit 23 outputs the input data-readout command signal (RD) to the external memory 4 as a data-readout command signal (ERD).

As a result, the external memory 4 reads out data from a storage location specified by the chip select signal (ECS) and address information (EADR) from the external memory interface unit 9 in response to the data-readout command signal (ERD) from the external memory interface unit 9. Then the readout data are supplied to the external memory interface unit 9.

At this time, in the external memory interface unit 9, the data read out from the external memory 4 are input to a data processing unit 24 including a cash memory 24A and a decryption circuit 24B. In this case, since the readout data are not encrypted, the data processing unit 24 directly supplies the data to the CPU 5.

When the semiconductor integrated circuit 3 is set to the second mode, the external memory 4 stores encrypted data encrypted by calculating the exclusive-OR.

In this case, for example, the CPU 5 may supply address information (ADR) indicating a storage location of data to be read out from the external memory 4 and a data-readout command signal (RD) of a readout instruction for the data to the external memory interface unit 9.

At this time, in the external memory interface unit 9, the address information (ADR) supplied from the CPU 5 is input to the address decoder 20. The address decoder 20 generates a chip select signal (ECS) based on the input address information (ADR) and outputs the generated chip select signal (ECS) to the external memory 4. In the external memory interface unit 9, the address information (ADR) is separated into higher-order bits and lower-order bits. Then, the higher-order bits are directly output to the external memory 4 and the lower-order bits are output to the external memory 4 via the timing control unit 23.

In the external memory interface unit 9, the data-readout command signal (RD) supplied from the CPU 5 is input to the timing control unit 23. The timing control unit 23 outputs the input data-readout command signal (RD) to the external memory 4 as a data-readout command signal (ERD).

As a result, the external memory 4 reads out encrypted data from a storage location specified by the chip select signal (ECS) and address information (EADR) from the external memory interface unit 9 in response to the data-readout command signal (ERD) from the external memory interface unit 9. Then the read out encrypted data are supplied to the external memory interface unit 9.

At this time, in the external memory interface unit 9, the data read out from the external memory 4 are input to the data processing unit 24. In this case, since the data read out from the external memory 4 are encrypted using the exclusive-OR, the decryption circuit 24B in the data processing unit 24 decrypts the encrypted data by calculating the exclusive-OR for the encrypted data and the address information (ADR) supplied from the CPU 5. Then the decryption circuit 24B supplies the decrypted data to the CPU 5.

When the semiconductor integrated circuit 3 is set to the third mode, the external memory 4 stores encrypted data encrypted using the exclusive-OR and DES encryption.

When using DES encryption, data are encrypted in 64-bit units. Therefore, the encrypted data will be stored in the external memory 4 in 64-bit units. Accordingly, in order for the external memory interface unit 9 to read out 8 bits of data from the external memory 4 in response to the data-readout command signal (RD) from the CPU 5, the semiconductor integrated circuit 3 reads out the 8 bits of data and also the other bits of data encrypted as a unit with the 8 bits of data.

Figure 3:
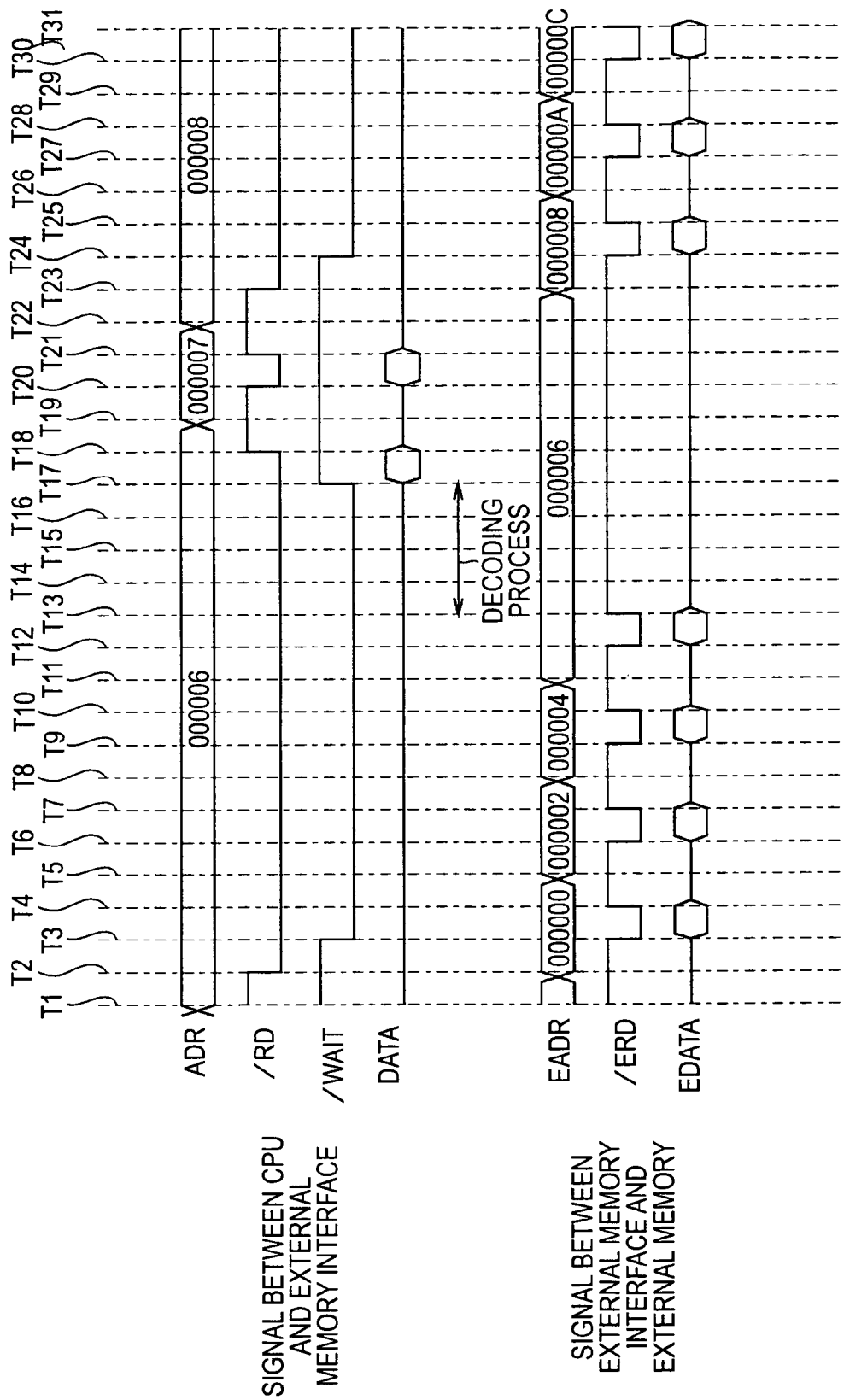
FIG. 3 illustrates a timing chart.

More specifically, for example, as shown in FIG. 3, the CPU 5 may start supplying address information (ADR) "000006 (hexadecimal)" indicating storage location of data to be read out from the external memory 4 at a timing T1 and then start supplying (activate) a data-readout command signal (RD) to the external memory interface unit 9 at a timing T2.

In response, the external memory interface unit 9 starts supplying (activates) a wait signal (WAIT) instructing the CPU 5 to wait until data are read out from the external memory 4 at a subsequent timing T3.

In the external memory interface unit 9, the address information (ADR) "000006 (hexadecimal)" supplied from the CPU 5 is input to the address decoder 20. The address decoder 20 generates a chip select signal (ECS) based on the input address information (ADR) and outputs the generated chip select signal (ECS) to the external memory 4. In the external memory interface unit 9, the address information (ADR) is separated into higher-order bits and lower-order bits. Then the higher-order bits are directly output to the external memory 4 and the lower-order bits are output to the external memory 4 via the timing control unit 23.

According to an embodiment of the present invention, the address information (ADR), for example, is a 24-bit data, as described above. The higher-order bits, for example, are the higher 21 bits of the address information (ADR) and the lower-order bits, for example, are the lower 3 bits of the address information (ADR).

The timing control unit 23 moves back the value of the lower-order bits of the input address information (ADR) by a predetermined amount using an internal counter circuit and supplies this value to the external memory 4. As a result, at the timing T2, the external memory interface unit 9 outputs the value "000000 (hexadecimal)" as address information (EADR) including both the higher-order bits and the lower-order bits to the external memory 4.

In the external memory interface unit 9, the data-readout command signal (RD) supplied from the CPU 5 is input to the timing control unit 23. For example, during the period of timing T3 to T4, the timing control unit 23 outputs the input data-readout command signal (RD) as a data-readout command signal (ERD) to the external memory 4.

As a result, the external memory 4 reads out, for example, 16 bits of encrypted data from a storage location specified by the chip select signal (ECS) and the address information (ADR) "000000 (hexadecimal)" sent from the external memory interface unit 9 during the period of timing T3 to T4 in response to the data-readout command signal (ERD) sent from the external memory interface unit 9. Then, the external memory 4 supplies the readout 16 bits of encrypted data to the external memory interface unit 9.

At this time, in the external memory interface unit 9, the 16 bits of encrypted data read out from the external memory 4 are input to the data processing unit 24. The data processing unit 24 stores the 16 bits of encrypted data in the internal cash memory 24A included in the data processing unit 24.

Subsequently, the timing control unit 23 moves back the value of the lower-order bits of the input address information (ADR) by a predetermined amount using the internal counter circuit and supplies this value to the external memory 4. As a result, for example, at a timing T5, the external memory interface unit 9 outputs a value "000002 (hexadecimal)" as address information (EADR) including both the higher-order bits and the lower-order bits to the external memory 4.

Furthermore, the timing control unit 23 outputs the data-readout command signal (RD) input from the CPU 5 as a data-readout command signal (ERD) to the external memory 4, for example, during the period of timing T6 to T7.

As a result, in response to the data-readout command signal (ERD) from the external memory interface unit 9, the external memory 4 reads out, for example, 16 bits of encrypted data from a storage location specified by the chip select signal (ECS) and the address information (EADR) "000002 (hexadecimal)" from the external memory interface unit 9 during the period of timing T6 to T7 and supplies the 16 bits of encrypted data to the external memory interface unit 9.

At this time, in the external memory interface unit 9, the 16 bits of encrypted data read out from the external memory 4 are input to the data processing unit 24. The data processing unit 24 stores the 16 bits of encrypted data in the cash memory 24A included in the data processing unit 24. As a result, a total of 32 bits of encrypted data is stored in the cash memory 24A.

In a similar manner, the timing control unit 23 moves forward, in sequence, the values of the lower-order bits of the input address information (ADR) using the internal counter circuit and supplies the values to the external memory 4 in sequence. As a result, the external memory interface unit 9 outputs the values "000004 (hexadecimal)" and "000006 (hexadecimal)" in sequence as address information (EADR) including both the higher-order bits and the lower-order bits to the external memory 4.

In this way, the external memory 4 reads out 16 bits of encrypted data from a storage location specified by the address information "000004 (hexadecimal)" and, at the same time, reads out 16 bits of encrypted data from another storage location specified by the address information "000006 (hexadecimal)." Then the external memory 4 supplies the two sets of 16 bits of encrypted data to the external memory interface unit 9 in sequence.

As a result, for example, at a timing T13, 64 bits of encrypted data will be stored in the cash memory 24A included in the data processing unit 24.

In response to this, the decryption circuit 24B performs DES decryption on the 64 bits of encrypted data stored in the cash memory 24A, for example, during the period of timing T13 to T17. Then the decryption circuit 24B decrypts the 64 bits of encrypted data by calculating the exclusive-OR for the data obtained as a result of the DES decryption and the higher-order bits of the address information (ADR) supplied from the CPU 5. The decryption circuit 24B extracts 8 bits of data corresponding to the address information "000006 (hexadecimal)" sent from the CPU 5 from the 64 bits of decrypted data. Then, the decryption circuit 24B starts to output the extracted 8 bits of data to the data bus connected to the CPU 5. At the same timing T17, the timing control unit 23 stops supplying (inactivates) the wait signal (WAIT) to the CPU 5.

When the wait signal (WAIT) is stopped in this way, the CPU 5 stops supplying (inactivates) the data-readout command signal (RD) to the external memory interface unit 9 and latches the 8 bits of data output to the data bus. Accordingly, the CPU 5 is capable of reading out data stored in the external memory 4 via the external memory interface unit 9.

When the semiconductor integrated circuit 3 is set to the fourth mode, encrypted data encrypted using an exclusive-OR and triple DES encryption is stored in the external memory 4. In this case, data are read out from the external memory 4 in the same manner as the above-described third mode.

(3) Operation and Advantages

The semiconductor integrated circuit 3 is capable of performing encryption in accordance with the storage location of data to be stored in the external memory 4 by employing the above-described structure.

For example, when the semiconductor integrated circuit 3 is set to the second mode, encryption is performed by calculating the exclusive-OR for the data to be stored in the external memory 4 and the address information indicating the storage location of the data. When the semiconductor integrated circuit 3 is set to the third mode, encryption is performed by calculating the exclusive-OR for the data to be stored in the external memory 4 and the address information indicating the storage location of the data and by subsequently performing DES encryption. When the semiconductor integrated circuit 3 is set to the third mode, encryption is performed by calculating the exclusive-OR for the data to be stored in the external memory 4 and the address information indicating the storage location of the data and by subsequently performing triple DES encryption.

The semiconductor integrated circuit 3 writes in the encrypted data obtained as a result of the encryption process into the external memory 4.

In this way, the encrypted data stored in the external memory 4 are encrypted in accordance with the storage location. Therefore, for example, if the encrypted data are copied from the external memory 4 onto another storage medium, it will be difficult to decrypt the encrypted data without knowing the storage location of the encrypted data in the external memory 4. As a result, data can be safely stored in the external memory 4.

When the external memory interface unit 9 in the semiconductor integrated circuit 3 reads out encrypted data from the external memory 4 in response to a data-readout command signal from the CPU 5, the external memory interface unit 9 decrypts the encrypted data and supplies the decrypted data obtained by the decryption process to the CPU 5. As a result, the CPU 5 can directly use the data supplied from the external memory interface unit 9 without decrypting the data.

Furthermore, when data are written in and/or read out from the internal memory 7 in the semiconductor integrated circuit 3 instead of the external memory 4, data-write command signals, data-readout command signals, and address information addressed to the internal memory 7 are output from the CPU 5. According to this embodiment, these signals and information are not sent outside the semiconductor integrated circuit 3. By preventing data related to the internal structure of the semiconductor integrated circuit 3 from being sent outside the semiconductor integrated circuit 3, the security of the data stored inside the semiconductor integrated circuit 3 is maintained.

According to the above-described structure, data to be stored in the external memory 4 are encrypted in accordance with the storage location of the data. Consequently, for example, if the encrypted data are copied from the external memory 4 onto another storage medium, it will be difficult to decrypt the encrypted data without knowing the storage location of the encrypted data in the external memory 4. As a result, data can be security stored in the external memory 4.

The CPU 5 in the semiconductor integrated circuit 3 according to this embodiment, for example, stores the address information of each item of data (encrypted data) stored in the external memory 4 in the internal memory 7. In this way, the semiconductor integrated circuit 3 can recognize the storage location of each data item stored in the external memory 4 and can easily read out the data from the external memory 4.

(4) Other Embodiments

In the embodiment described above, as illustrated in FIG. 2, only the decryption circuit 24B is disposed inside the external memory interface unit 9. However, the present invention is not so limited, and an encryption circuit 24CX may also be disposed in the external memory interface unit 9X, as illustrated in FIG. 4 (components in FIG. 4 that are the same as those in FIG. 2 are indicated by the same reference numerals).

Figure 4:
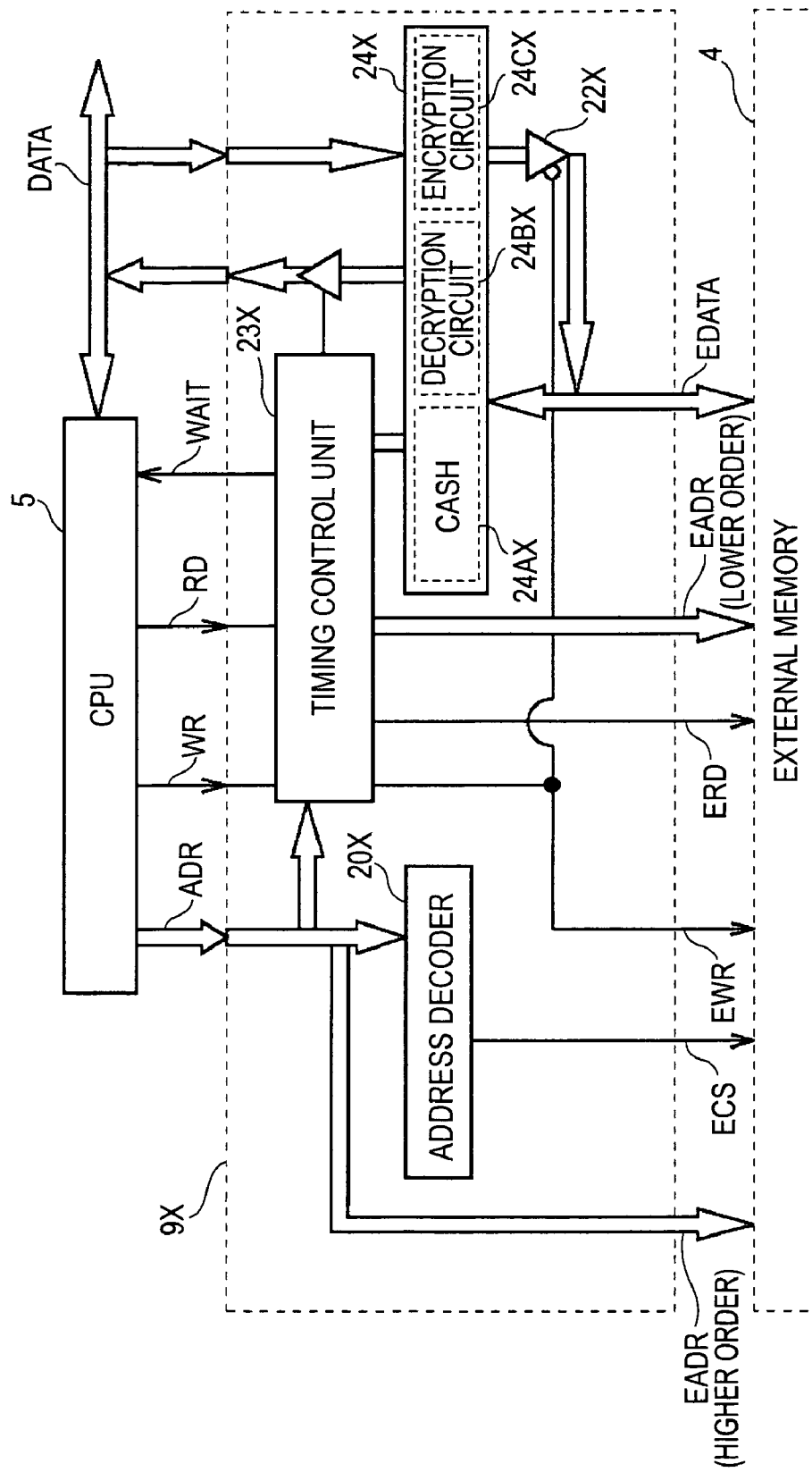
FIG. 4 illustrates a schematic view of the structure of an external interface unit (2).

The operation of an external memory interface unit 9X, as illustrated in FIG. 4, for storing data encrypted only by an exclusive-OR in an external memory 4 will be described below.

For example, a CPU 5 may supply data (DATA) to be stored in the external memory 4 and address information (ADR) indicating the storage location of the data (DATA) to the external memory interface unit 9X together with a data-write command signal (WR) of a write instruction for the data.

At this time, in the external memory interface unit 9X, the data (DATA) supplied from the CPU 5 is supplied to an encryption circuit 24CX in a data processing unit 24X. The encryption circuit 24CX calculates the exclusive-OR for the supplied data (DATA) and, for example, the address information (ADR) supplied from the CPU 5 via a timing control unit 23X. The data obtained as a result is sent to a switch circuit 22X as encrypted data.

In the external memory interface unit 9X, the address information (ADR) supplied from the CPU 5 is input to an address decoder 20X. The address decoder 20X generates a chip select signal (ECS) based on the input address information (ADR) and outputs the generated chip select signal (ECS) to the external memory 4. In the external memory interface unit 9X, the address information (ADR) supplied from the CPU 5 is separated into higher-order bits and lower-order bits. Then, the higher-order bits are directly output to the external memory 4, and the lower-order bits are output to the external memory 4 via a timing control unit 23X.

Furthermore, in the external memory interface unit 9X, the data-write command signal (WR) supplied from the CPU 5 is supplied to the timing control unit 23X. The timing control unit 23X outputs the data-write command signal (WR) to the external memory 4 at a predetermined timing as a data-write command signal (EWR). When the data-write command signal (EWR) is output from the timing control unit 23X, in response, the switch circuit 22X starts sending the encrypted data supplied from the encryption circuit 24CX to the external memory 4.

In this way, the external memory 4 writes in the encrypted data from the external memory interface unit 9X in a storage location specified by the chip select signal (ECS) and address information (EADR) from the external memory interface unit 9X in response to the data-write command signal (EWR) sent from the external memory interface unit 9X.

Next, the operation of the semiconductor integrated circuit 3 for updating data encrypted by an exclusive-OR and DES encryption and already stored in the external memory 4 will be described below.

For example, the CPU 5 may supply data (DATA) for updating 8 bits of data already stored in the external memory 4 (hereinafter, this data is referred to as 'update data') and address information (ADR) indicating the storage location of 8 bits of data to be updated by the update data (DATA) (hereinafter, this data is referred to as 'updated data') to the external memory interface unit 9X together with a data-write command signal (WR).

At this time, the external memory interface unit 9×starts supplying, to the CPU 5, a wait signal (WAIT) instructing the CPU 5 to wait until the update data (DATA) is written in the external memory 4.

Then, the external memory interface unit 9X directly outputs the higher-order bits of the address information (ADR) supplied from the CPU 5 to the external memory 4. Subsequently, the external memory interface unit 9X modifies the lower-order bits of the address information (ADR) in sequence using a counter circuit included in the timing control unit 23X to read out, in sequence, 64 bits of encrypted data including the updated data from the external memory 4 and then stores the read out encrypted data in the cash memory 24AX in the data processing unit 24X.

When the 64 bits of encrypted data including the updated data are stored in the cash memory 24AX in this way, in response, a decryption circuit 24BX in the data processing unit 24X performs DES decryption on the 64 bits of encrypted data. The decryption circuit 24BX calculates the exclusive-OR for the data obtained after performing DES decryption and the higher-order bits of the address information (ADR) supplied from the CPU 5 to decrypt the 64 bits of data.

The data processing unit 24X overwrites the updated data included in the 64 bits of data decrypted by the decryption circuit 24BX with the update data supplied from the CPU 5. Subsequently, the encryption circuit 24CX in the data processing unit 24X calculates the exclusive-OR for the overwritten data and the higher-order bits of the address information (ADR) supplied from the CPU 5. In this way, 64 bits of encrypted data are generated by performing DES encryption on the data obtained as a result.

Subsequently, the external memory interface unit 9X directly outputs the higher-order bits of the address information (ADR) supplied from the CPU 5 to the external memory 4 and modifies, in sequence, the lower-order bits of the address information (ADR) using the counter circuit in the timing control unit 23X. In this way, the external memory interface unit 9X rewrites the 64 bits of encrypted data in the external memory 4. After rewriting the 64 bits of encrypted data, the external memory interface unit 9X stops supplying the wait signal (WAIT) to the CPU 5.

In this way, the encrypted data in the external memory 4 are updated. The readout operation of the external memory interface unit 9X illustrated in FIG. 4 is the same as the readout operation of the external memory interface unit 9 described above.

In the above embodiments, the reader-writer apparatus 1 for performing data communication with a noncontact integrated circuit (IC) card without any contact is used as an information processing apparatus including the semiconductor integrated circuit 3 and the external memory 4 disposed outside the semiconductor integrated circuit 3. The present invention, however, is not so limited, and embodiments of the present invention may be employed in various other information processing apparatuses, such as personal computers, mobile phones, and personal digital assistances (PDAs).

In the above-described embodiments, combination processing for calculating an exclusive-OR to combine data to be stored in the external memory 4 and address information indicating the storage location of the data is performed. The present invention, however, is not so limited, and for example, combination processing for calculating AND, OR, NAND, or NOR may be performed instead. Before carrying out such a process, a transposition process for moving each bit of the data stored in the external memory 4 to a different location or moving each bit of the address information indicating the storage location of the data stored in the external memory 4 to a different location may be performed. Furthermore, the transposition processing may be performed on the data obtained by the combination processing.

In the above-described embodiments, nonvolatile memory is used as the external memory 4 disposed outside the semiconductor integrated circuit 3. The present invention, however, is not so limited, and various other storage units, such as a ROM and hard disk drive, may be used to store data outside the semiconductor integrated circuit 3.

In the above-described embodiments, the encryption circuits 8 and 24CX are used as encrypting means for generating encrypted data. The present invention, however, is not so limited, and various other structures may be employed. Likewise, in the above-described embodiments, the external memory interface units 9 and 9X are used as write means for writing encrypted data in the external memory 4 and readout means for reading out encrypted data from the external memory 4. The present invention, however, is not so limited, and various other structures may be employed. In the above-described embodiments, the decryption circuits 24B and 24BX are used as decrypting means for decrypting the encrypted data in accordance with the storage location of the encrypted data. The present invention, however, is not limited, and various other structures may be employed.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing apparatus for input data, comprising, in combination:
   a semiconductor integrated circuit comprising a central processing unit CPU controlling read, write and encryption operations on said input data, an external memory interface circuit and an external memory disposed outside the semiconductor integrated circuit and responsive to control signals from said central processing unit CPU through said external memory interface circuit and said external memory; wherein said semiconductor integrated circuit further includes, an encryption circuit responsive to said central processing unit CPU generating encrypted data by encrypting the input data to be stored in the external memory;
write means responsive to said central processing unit CPU for writing the encrypted data into the external memory;
readout means responsive to said central processing unit CPU for reading out the encrypted data from the external memory; and
a decryption circuit decrypting the readout encrypted data from the external memory,
said central processing unit CPU providing address (ADR), data write command WR, read (RD), wait, and data signals to said external memory interface, said external memory interface providing external address (EADR), external read (ERD), external data signals (EDATA), and an address decoder receiving said input address information from said central processing unit and providing as an output a chip select signal (ECS) to said external memory, said chip select signal ECS providing address information indicating a storage location of the input data to be stored as encrypted data at said storage location in said external memory, wherein
the encryption circuit generates the encrypted data by performing encryption of the input data for the storage location of the encrypted data to be stored in the external memory, and
the decryption circuit decrypts the readout encrypted data in accordance with the storage location of the encrypted data,
so that if the encrypted data are copied from the external memory, it is difficult to decrypt the encrypted data without knowing the storage location of the encrypted data in the external memory.

2. The information processing apparatus according to claim 1, wherein said address decoder has its output connected to a logic circuit that has as another input the data write command WR and to a switch receiving input data through the switch controlled by said output of said logic circuit.

3. The information processing apparatus according to claim 2, wherein the external memory interface circuit generates the encrypted data by carrying out combination processing for combining the data to be stored in the external memory and address information indicating the storage location of the data.

4. The information processing apparatus according to claim 3, wherein the logic circuit provides combination processing and includes an exclusive-OR for the data and the address information to provide the chip select signal ECS and data write command EWR signal to said external memory.

5. The information processing apparatus according to claim 1, wherein the external memory interface generates encrypted data by carrying out data encryption after carrying out combination processing for combining the data to be stored in the external memory and the address information indicating the storage location of the data, and further including a timing control unit providing said WAIT signal to said central processing unit.

6. The information processing apparatus for data, according to claim 1, wherein said encryption circuit and said decryption circuit are both located in said external memory interface unit.

7. An information processing apparatus comprising:
a semiconductor integrated circuit having at least a central processing unit CPU and an external memory interface unit; and
an external memory disposed outside the semiconductor integrated circuit and in circuit with said external memory interface circuit,
wherein the external memory interface of the semiconductor integrated circuit includes,
readout means responsive to said central processing unit CPU for reading out encrypted data corresponding to unencrypted input data from the external memory disposed outside the semiconductor integrated circuit, the external memory storing the encrypted data generated by encrypting the input data to be stored in the external memory at a location determined by address information provided by an encryption circuit of said external memory interface said central processing unit CPU providing input address information for said storage location to an address decoder in circuit with said external memory; and
a decryption circuit decrypting the readout encrypted data EDATA from said external memory and wherein
the external memory interface includes:
readout means for reading out encrypted data from the external memory disposed outside the semiconductor integrated circuit, the external memory storing encrypted data generated by encrypting data to be stored in the external memory at an address location determined in the encrypting operation of said external memory interface; and
the decryption circuit decrypts the readout encrypted data in accordance with the storage location of the encrypted data
wherein, if the encrypted data are copied from the external memory onto another storage medium, it will be difficult to decrypt the encrypted data without knowing the storage location of the encrypted data in the external memory.

8. An information processing apparatus comprising:
a semiconductor integrated circuit that includes a central processing unit CPU controlling transmission and reception of input data, an external memory interface responsive to said central processing unit CPU and both sending and receiving signals from an external memory disposed outside the semiconductor integrated circuit and responsive to signals from said central processing unit CPU,
wherein the external memory interface of said semiconductor integrated circuit includes,
an encryption unit for generating encrypted data by encrypting the input data to be stored in an external memory at a storage location in said external memory determined according to an address signal having a higher order portion and a lower order portion, said encryption unit including an address decoder receiving input address information ADR from said central processing unit and providing a chip selection signal output for writing data when available to said external memory;
a write unit responsive to said central processing unit CPU writing the encrypted data into the external memory at said storage location;
a readout unit responsive to said CPU reading out the encrypted data from the external memory; and
a decryption unit for decrypting the readout encrypted data,
wherein, if the encrypted data are copied from the external memory onto another storage medium, it will be difficult to decrypt the encrypted data without knowing the storage location of the encrypted data in the external memory.

* * * * *